United States Patent [19]

Hach

[11] 4,086,062

[45] Apr. 25, 1978

[54] DIGITAL TITRATION DEVICE

[75] Inventor: Clifford C. Hach, Ames, Iowa

[73] Assignee: Hach Chemical Company, Ames, Iowa

[21] Appl. No.: 771,248

[22] Filed: Feb. 23, 1977

[51] Int. Cl.2 .......................... B01L 3/02; B67D 5/22; F16B 7/04

[52] U.S. Cl. .................................. 23/259; 23/253 R; 23/292; 222/46; 222/327; 403/290

[58] Field of Search ..................... 23/259, 292, 253 R, 23/253 US; 222/32, 41, 46, 23, 33, 390, 326, 327; 285/401, 402; 403/118, 290, 313, 343, 344

[56] References Cited

U.S. PATENT DOCUMENTS

| | | | |
|---|---|---|---|
| 2,076,121 | 4/1937 | Dickinson | 285/401 X |
| 2,794,961 | 6/1957 | Knight | 403/290 X |
| 2,925,198 | 2/1960 | Healey | 222/32 |
| 2,946,486 | 7/1960 | Gilmont | 222/32 X |
| 3,175,734 | 3/1965 | Heiss | 23/253 R X |
| 3,565,470 | 2/1971 | Nicol et al. | 403/290 |
| 3,605,829 | 9/1971 | Genese et al. | 222/327 X |
| 3,819,091 | 6/1974 | Hollender | 222/327 |
| 3,885,562 | 5/1975 | Lampkin | 222/23 X |

*Primary Examiner*—Joseph Scovronek
*Attorney, Agent, or Firm*—Leydig, Voit, Osann, Mayer & Holt, Ltd.

[57] ABSTRACT

A liquid dispensing device for chemical titration having a reciprocating plunger for expelling fluid from an attached titrating solution cartridge, and a lead screw for reciprocating the plunger whose rotation is measured and displayed by a digital rotation counter. The plunger can be selectively uncoupled from the lead screw to permit direct plunger positioning. A pair of manual knobs allow rapid direct rotation of the lead screw or slower, geared down rotation of the screw.

6 Claims, 7 Drawing Figures

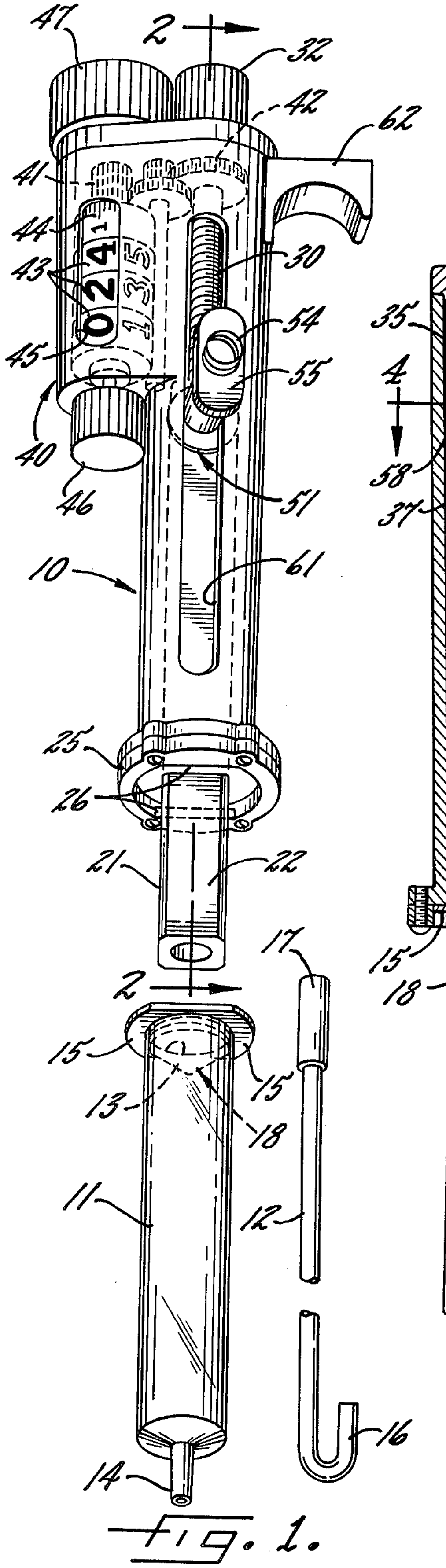
FIG. 1.
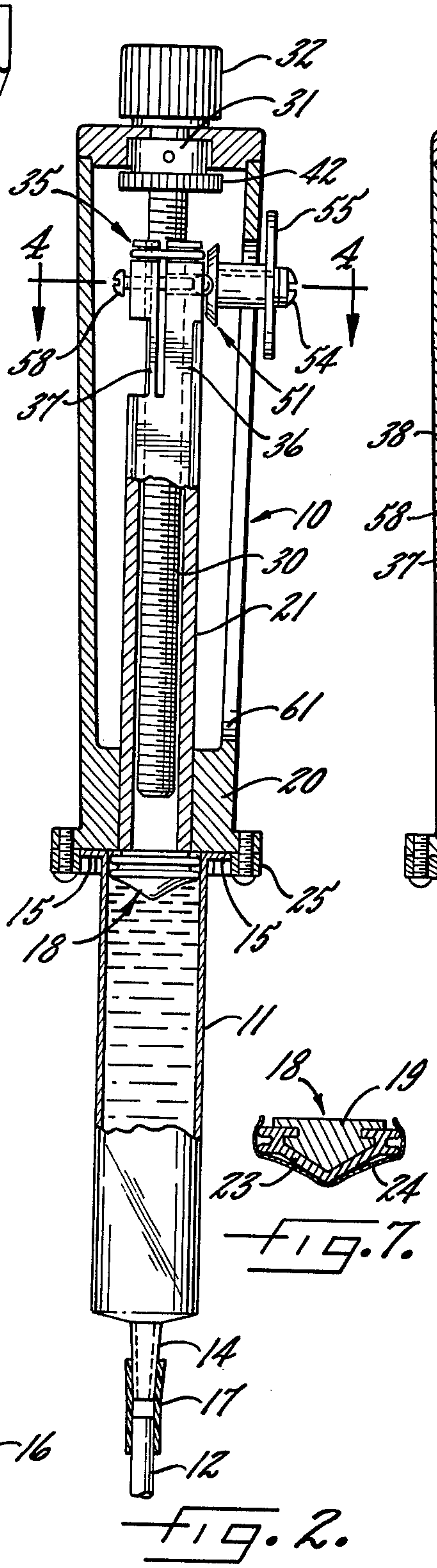
FIG. 2.
FIG. 7.
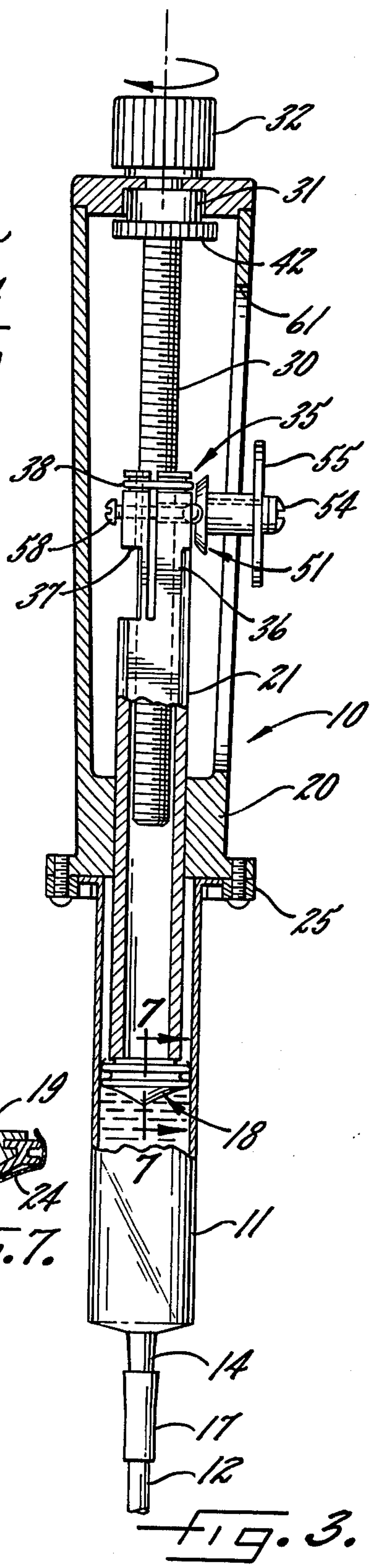
FIG. 3.

DIGITAL TITRATION DEVICE

This invention relates generally to measured liquid dispensing devices and more particularly concerns a device for performing chemical titration analysis.

Chemical titration is one of the more common form of chemical analysis. The technique usually involves adding a color change indicator to a given volume of liquid sample containing the unknown concentration, and then carefully measuring the volume of a titration solution — having a known concentration of reactants — needed to bring the sample to end point, i.e. whereat all of the unknown in the sample has been converted to a color indication producing compound. By appropriately formulating the titrating solution and using a fixed volume of sample, a straight line relationship between the amount of solution required to reach end point and the amount of the unknown being tested for can be established. And by appropriately scaling the volume of titrating solution required, a direct readout of the quantity of unknown can be obtained.

The conventional apparatus for adding and measuring titrating solution is the glass burette, which is essentially a piece of laboratory apparatus that is somewhat fragile and rather awkward to use and maintain.

It is the primary aim of the invention to provide a titration device having none of the limitations of a burette in that it is convenient to handle and use, suitable for field as well as laboratory testing, and easy to maintain.

Another object of the invention is to provide a device of the above character which gives a direct digital readout of the amount of solution dispensed so that, when combined with an appropriate sample volume and titrating solution formulation, a direct digital readout of the unknown concentration is obtained.

A further object is to provide a device as referred to above that is rugged, accurate, and essentially simple in design so as to maintain accuracy and reliability even under demanding use conditions.

Other objects and advantages of the invention will become apparent upon reading the following detailed description and upon reference to the drawings, in which:

FIG. 1 is a perspective of a device embodying the invention together with an associated titrating solution cartridge and delivery tube;

FIG. 2 is a section taken approximately along the line 2—2 in FIG. 1 showing the FIG. 1 parts in assembled relation;

FIG. 3 is similar to FIG. 2 with the parts shown in a different operating position;

FIG. 7 is a section taken approximately along line 7—7 in FIG. 3.

Figure 4:
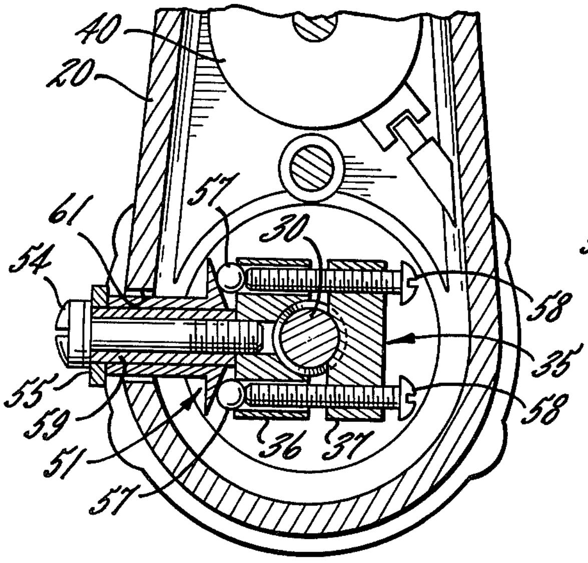
FIGS. 4 and 5 are enlarged fragmentary sections taken approximately along the line 4—4 in FIG. 2 and showing the parts in different operating positions.
Figure 5:
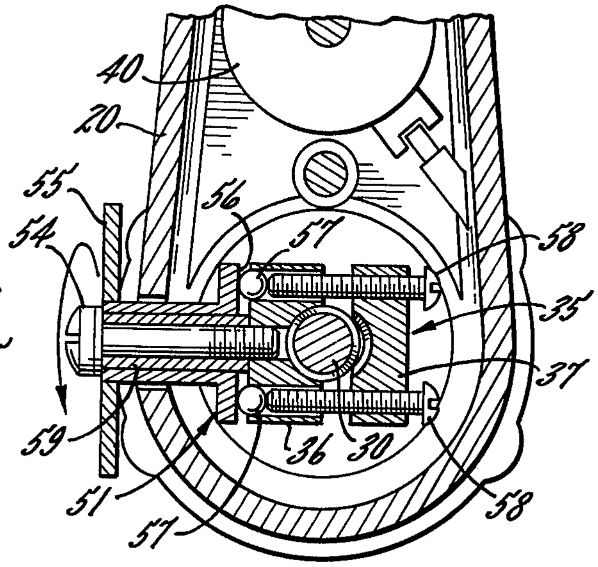

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning first to FIG. 1, there is shown a titration device 10 embodying the invention and associated with a titrating solution containing cartridge 11 and a delivery tube 12. The cartridge 11 is preferably cylindrical with an open end 13 and an opposed nozzle 14, and is formed of transparent plastic with oppositely extending flanges 15 at the open end 13. The cartridge open end 13 is sealed by a piston cap 18 (see FIG. 7) that can be slid through the length of the cartridge 11 while maintaining the seal. Preferably, the cap 18 includes a rigid plug 19 about which is interfitted an elastic element 23 having annular sealing flanges to engage the inner wall of the cartridge 11. A sheet 24 of inert film such as tetrafluoroethylene is pulled about those portions of the cap 18 in contact with the cartridge 11 or the liquid therein. The film sheet 24 facilitates sliding movement of the cap 18 and minimizes the likelihood of any reaction between the liquid and the materials of the cap.

The tube 12 is preferably a length of reasonably stiff plastic capillary tubing with an upturned lower end 16 and a short length of connecting and sealing hose 17 at the upper end adapted to be fitted over the nozzle 14 so as to allow the tube 12 to become an extension of the nozzle that is sufficiently long to reach down into, for example, a sample containing flask.

The device 10 includes a frame 20 mounting a plunger 21 for reciprocation from a retracted position (FIG. 2) to an extended position being approached in FIG. 3. In the illustrative embodiment, the plunger 21 is hollow and is formed with at least one flat side 22 which, fitting closely in the frame 20, prevents plunger rotation.

The cartridge 11 is releasably locked on the device 10 by fitting the cartridge flanges 15 within a frame end plate 25 defining bayonet-type locking slots 26 and then giving the cartridge a partial turn to lock the flanges 15 in the slots 26. This positions the cartridge open top 13 and aligns the plunger 21 with the piston cap 18 so that movement of the plunger 21 from its retracted position toward its extended position drives the cap 18 through the cartridge, expelling liquid from the nozzle 14 and the delivery tube 12 fitted onto the nozzle. Obviously the amount of fluid expelled from the cartridge 11 will be dependent on the extent of plunger movement into the cartridge.

For moving the plunger 21, a lead screw 30 is mounted by a collar 31 and a control knob 32 for rotation, but not linear movement, in the frame 20. The screw 30 is approximately as long as, and is loosely fitted within, the hollow plunger 21. A nut 35 couples the plunger 21 and the lead screw 30, with the nut 35 consisting of split portions 36 and 37 of the end of the plunger 21. The split plunger end portions 36, 37 are internally threaded and normally pressed into engagement with the threads of the lead screw 30 by a circular clamp spring 38. It will be apparent that using the control knob 32 to rotate the lead screw 30 drives the plunger 21 in its reciprocating path. By using fine screw and nut threads, slow precise movement of the plunger results, thus giving precise control of the volume of liquid expelled from the cartridge.

For displaying a readout of the amount of liquid dispensed, a resettable, digital readout, rotation counter 40 is mounted in the frame 20 with the counter input shaft 41 coupled by stepped down gearing 42 to the lead screw 30. The counter 40 is of the conventional type having indicia wheels 43 for hundreds, tens and units and a hundredths drum 44, all interconnected in the usual fashion and displaying through a window 45 in the frame 20. A reset knob 46 is provided to zero the counter 40. Preferably, a larger control knob 47 is mounted on the counter input shaft 41 exteriorly of the frame 20. Because of the stepped down gearing 42 from the counter 40 to the lead screw 30, the knob 32 functions as a rapid advance control knob for the plunger 21 and the knob 47 serves as a slow advance knob for the plunger. In either case, rotation of the screw 30 is digitally measured and displayed by the counter 40.

Figure 6:
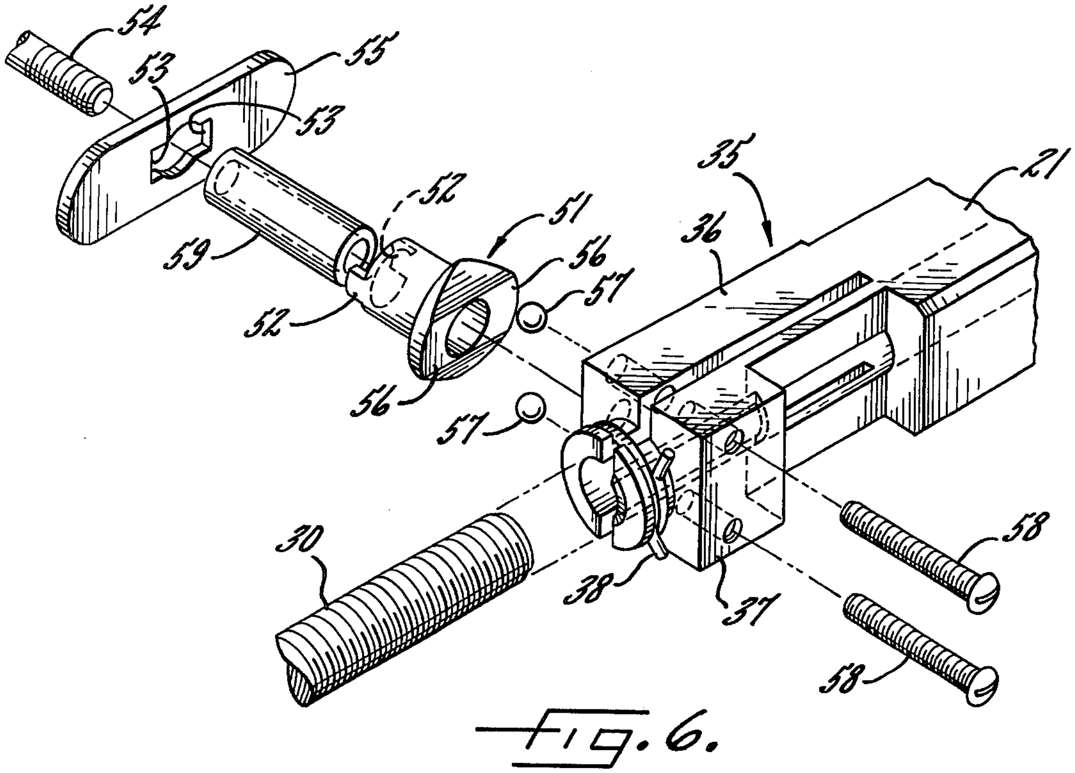
FIG. 6 is a fragmentary exploded perspective of a portion of the device shown in the other figures.

To permit the plunger 21 to be disengaged from the screw 30 for quick initial positioning or retraction, a cam 51 is attached by lugs 52, slots 53 and a screw 54 to a lever 55 positioned exteriorly of the frame 20 (see particularly FIG. 6) so that a quarter turn of the lever 55 and cam 51 causes cam surfaces 56 to bear on friction reducing balls 57 that are trapped in engagement with the ends of screws 58 firmly threaded in nut portion 37 and passing loosely through nut portion 36. The cam 51 is anchored to the nut portion 36 through the screw 54 and a sleeve 59. Causing the balls 57 to ride up onto the surfaces 56 by rotating the lever 55 forces the split nut portions 36, 37 apart against the force of the spring 38 and thereby releases the nut 35 from the screw 30. The lever 55 and cam 51, projecting through a slot 61 in the frame 20, can then be moved linearly to position the plunger 21.

The overall shape of the titration device 10 is preferably like a handle proportioned for fitting in the fist of one hand, and a frame includes a finger hook 62 to fit over the first finger of the user's hand and prevent the device from falling through an inadvertently loosened grip. When so held, the user's thumb can easily manipulate the control knob 47.

To operate the device 10 a cartridge containing the titrating solution to be used in the contemplated analysis is locked to the end of the device 10 by interfitting the cartridge flanges 15 with the slots 26 in the end plate 25. If desired, a clean delivery tube 12 is fitted onto the cartridge nozzle 14. If the cartridge is partially empty, as would be the case if it had been previously used, the lever 55 is rotated a quarter turn and the plunger 21 moved into the cartridge so as to engage the piston cap 18, fill the tube 12 and thus prepare the device 10 for the titration analysis. The counter reset knob 46 is rotated to zero out the counter and the device is thereafter ready for the measured dispensing of titrating solution.

To perform the analysis the tip 16 of the delivery tube 12 is placed into a measured amount of sample containing the unknown concentration and either the knob 32 or the control knob 47 is turned to rotate the lead screw 30 thus driving the plunger 21 into the cartridge 11. The control knob being used is rotated until end point is reached, and the delivery tube 12 can be utilized to stir the sample. The distance the plunger moves into the cartridge is directly related to the volume of liquid dispensed and is also directly related to the rotation of the screw 30 being measured by the counter 40. By utilizing a preselected volume of sample and appropriately formulating the titrating solution contained by the cartridge 11 the device 10 can give a direct digital readout of the unknown concentration.

It will be apparent that the device 10 is portable and can be utilized in the field as well as the laboratory. The particular analysis being performed depends upon the nature of the solution being contained in the cartridge 11 and simply by switching cartridges the device 10 becomes adapted to run a different titration analysis.

It will also be apparent that the device 10 is of essentially simple design and is quite rugged so as to maintain accuracy and reliability even under very demanding use conditions.

By appropriately formulating a family of titrating solutions capable of being stored in their individual cartridges a corresponding number of chemical titration analyses can be run with the user obtaining a direct digital readout of the unknown concentration being tested for.

I claim as my invention:

1. A liquid dispensing device for titration comprising, in combination, a frame, a plunger mounted for reciprocation in said frame from a retracted position to an extended position, a preloaded titration liquid containing cartridge having an open end sealed by a slidable piston cap and a nozzle at the opposite end, means for locking said open end of the liquid containing cartridge on said frame in a position wherein said cap receives said plunger whereby movement of the plunger from said retracted position toward said extended position expels liquid through said nozzle in said cartridge, a lead screw mounted for rotation in said frame, means on said frame for measuring rotation of said screw, a nut for coupling said plunger to said screw so that rotation of the screw reciprocates the plunger, and a control for selectively rotating said screw.

2. The combination of claim 1 in which said nut consists of a split assembly and the combination includes means coupled to said plunger for separating said assembly and thus releasing the nut from the screw for direct reciprocation of the plunger without rotation of the lead screw.

3. The combination of claim 2 in which said means for separating comprises a cam movable by a lever positioned exteriorly of said frame so that said lever can be manipulated to release said nut and then be moved linearly to reciprocate said plunger.

4. The combination of claim 1 in which said means for measuring comprises a resettable, digital readout, rotation counter having an input shaft coupled for rotation with said lead screw.

5. The combination of claim 4 in which said input shaft is coupled to said lead screw through stepped down gearing, and said control for selectively rotating said screw includes both a rapid advance knob on said screw and a slow advance knob on said input shaft.

6. The combination of claim 1 in which said means for locking comprises a frame end plate defining bayonet-type locking slots for receiving flanges formed at the open end of said container.

* * * * *